May 5, 1953     O. H. LUDEMAN     2,637,520
VALVE
Filed March 25, 1952
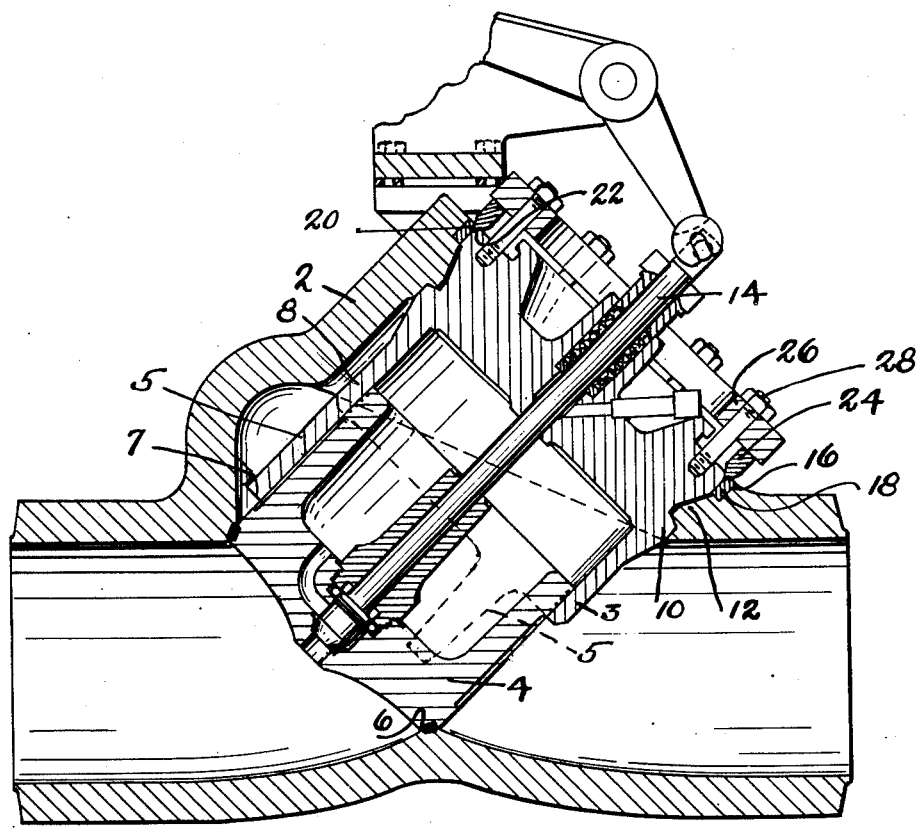
INVENTOR.
OSCAR H. LUDEMAN
BY *James G. Bechell*
ATTORNEY Patented May 5, 1953

2,637,520

UNITED STATES PATENT OFFICE 2,637,520

VALVE

Oscar H. Ludeman, New York, N. Y.

Application March 25, 1952, Serial No. 278,437

3 Claims. (Cl. 251—156)

My invention relates to an improvement in valve constructions.

More specifically my invention is concerned with valve constructions in which the valve is adapted to be reciprocated along the interior of a tubular cylindrical member which is removably mounted within the valve body. Such a valve is shown for example in my co-pending application Serial No. 257,787 filed November 23, 1951, of which the present application is a continuation-in-part.

The outer end of the cylindrical member is solid as distinguished from tubular and locking means are provided between this portion of the cylindrical member and the valve body which takes the steam thrust on the valve and locks the cylindrical member within the valve body.

To prevent steam leakage between the outer end of the cylindrical member and the valve body I provide a groove between the cylindrical member and the valve body which is sealed by a sealing ring removably held in place by a bolted down clamping ring.

To remove the valve assembly from the valve body it is simply necessary to remove the clamping ring and then by giving the cylindrical member a partial turn to disengage the locking means the valve and cylindrical member may be pulled out as a unit through the open end of the valve body.

This is a very simple construction and requires the minimum of time and effort for operation.

The sealing ring may be wedge-shaped in cross section and the groove may be complementary thereto; or the ring and groove may be so shaped that line contact is made with the groove so as to provide a hermetic seal. The ring and seat are of suitable metals and whenever it may be found desirable either one or both may be ground to precise shape.

In the accompanying drawing I have illustrated an embodiment of my invention in sectional elevation.

Referring to the drawing in detail 2 designates the valve body, 4 designates the valve, and 6 designates the seat for the valve.

8 designates a tubular cylindrical member which is removably mounted within the valve body 2. This member 8, in fact the entire valve assembly can be withdrawn through the outer end of the valve body, but is normally locked against such withdrawal by lugs or projections 10 provided at intervals circumferentially of the cylindrical member, these lugs cooperating with lugs 12 provided at intervals on the inner face of the valve body. By simply giving the cylindrical member a partial turn the lugs 10 will disengage the lugs 12 so that the entire assembly is free to be withdrawn through the open end of the valve body.

The valve stem is designated 14 and projects through the solid outer end of the cylindrical tubular member 8 to the exterior of the valve body where it may be operated by any convenient means, as for example, by detachable means such as disclosed in my co-pending application above referred to.

As will be observed from the drawing the tubular portion of the cylindrical member 8 has a continuous wall 3 for but a short distance beyond the inner face of the solid outer end of the cylindrical member, just enough to provide a substantial overlapping of the valve 4, when the latter is closed. From this point to the inner end of the tubular portion of the cylindrical member the tubular wall is formed to provide three spaced legs 5 which help to guide the valve in its opening and closing movements, the inner ends of these legs abutting lugs 7 which are formed on the interior of the valve body to prevent deflection of the legs 5. By this arrangement I provide for the minimum resistance to steam flow past the cylindrical member.

With the valve in service it will be appreciated that while the lugs 10 and 12 will take the steam thrust, some means must be provided to prevent leakage of steam between the outer end of the member 8 and the valve body 2. In this connection I provide an annular groove 16 in the valve body 2 and surrounding the outer end of the member 8. Welded or otherwise permanently secured in this groove in the construction illustrated is a metal ring or liner 18. This liner may be an alloy or corrosion resistant steel. The inner face of the liner ring 18 is shown as bevelled at 20, and the periphery of the outer end of the member 8 is similarly bevelled in the opposite direction as shown at 22, so as to provide a wedge-shaped annular groove between the valve body and the member 8.

24 designates a sealing ring which preferably is an alloy and is held in place by a clamping ring 26 which may or may not be integral with it and is bolted by bolts 28 to the end face of the member 8. The lower or inner end of the sealing ring is shown as wedge-shaped so as accurately to fit the wedge-shaped annular groove 16 above described between the valve body and the member 8. If desired the cross-section of the ring 24 may be altered so as to provide merely a line contact between the ring and the sealing groove.

When the nuts on the bolts 28 are set up it will be quite apparent that the sealing ring will be drawn down into the sealing groove to provide a steam tight joint between member 8 and the valve body, and to draw the lugs 10 and 12 into solid contact.

Inasmuch as the nuts on the bolts 28 are accessible at any disposition of the valve body, it will be apparent that should a leak develop at any time between the sealing ring and its seal, it is a simple matter to tighten the bolt nuts. By the same token it is a simple matter when necessary to remove the bolt nuts and lift off the sealing ring, so that the valve assembly may be removed from the valve body.

While the sealing groove and sealing ring are accurately shaped initially it will be apparent that at any time it may be necessary or desirable the sealing ring may be made available for grinding by simply removing the bolt nuts and lifting off the ring. The sealing groove 16 or seat for the ring can of course be ground in place without removal of the valve assembly and without disassembling the valve to any extent other than to remove the sealing ring.

It will be seen from all of the foregoing that I have provided a very simple construction to meet my requirements. All parts are readily accessible at all times and nothing more is required to assemble and disassemble the valve and its sealing mechanism than a wrench.

I am aware that prior to my invention it has been suggested that a weld seal be provided between a valve and its body. Such construction, however, has many disadvantages as compared with my invention. Usually some sort of a ring necessarily is provided below the weld site to prevent accidental fusing of the valve body and valve in the welding operation, and in some constructions it has been found necessary to provide another ring below the first one to prevent flow or splattering of the welding metal below the welding area. Then again when the valve is to be removed from its body the welding seal has to be chipped and burned out, all of which is time consuming, and requires the services of a skilled welder, and furthermore the valve may be so located that it is impossible to apply a welding torch to it.

In my construction no tools other than a wrench are required, and no special skill is necessary to remove the nuts from the bolts 28 and lift off the sealing ring, nor is it material in what position the valve body may be installed.

It is to be understood that the mechanism for opening and closing the valve is immaterial so far as the present invention is concerned, and the operating mechanism of my co-pending application has been mentioned merely for purposes of illustration.

What I claim is:

1. In valve mechanism the combination of a valve body, a cylindrical member within the valve body, locking lugs on the interior of the valve body and on the exterior of said cylindrical member, said lugs being spaced from each other circumferentially of the valve body and cylindrical member, the lugs on the body being staggered with respect to those on the cylindrical member whereby the two sets of lugs may be disengaged by partially rotating the cylindrical member, to permit the latter to be withdrawn endwise from the valve body, a valve within the cylindrical member and having a stem passing to the exterior of the cylindrical member, whereby the valve and cylindrical member may be removed as a unit from the valve body, an annular sealing groove between the valve body and the outer end of the said cylindrical member, a sealing ring seating in said groove, and a clamping ring removably secured to the end of the cylindrical member for forcing and holding the sealing ring in sealing relation to said groove.

2. In valve mechanism the combination of a valve body, a cylindrical member removably mounted therein locking lugs on the interior of the valve body; cooperating lugs on the exterior of the cylindrical member for removably locking the cylindrical member in the valve body, an annular sealing groove between the cylindrical member and valve body, a sealing ring overlying and extending into said annular sealing groove, and a clamping ring bolted to the end of the cylindrical member and bearing against said sealing ring to force the latter into the said channel to provide a hermetic seal between the cylindrical member and the valve body and to draw said locking lugs into firm engagement with each other.

3. In valve mechanism the combination of a valve body, a cylindrical member removably mounted therein, the outer end of said cylindrical member being solid, its intermediate portion being tubular, and its inner end being tubular with portions removed to provide leg-like elements extending lengthwise of the member into contact with the bottom portion of the valve body, a valve; adapted to be reciprocated in said cylindrical member while being guided by said leg formation and by the said intermediate portion of the cylindrical member locking lugs on the interior of the valve body and cooperating lugs on the exterior of the solid portion of the cylindrical member, said sets of lugs being staggered relatively whereby when the cylindrical member is rotated for a partial turn the lugs will be disengaged, an annular sealing groove at the outer end of the cylindrical member between it and the valve body, a sealing ring overlying said groove, and a clamping ring bolted to the outer end of the cylindrical member for forcing the sealing ring into the said groove to provide a hermetic seal and to draw the locking lugs into solid contact with each other.

OSCAR H. LUDEMAN.

References Cited in the file of this patent

UNITED STATES PATENTS

| Number | Name | Date |
|---|---|---|
| 1,041,237 | Budlong | Oct. 15, 1912 |
| 2,143,399 | Abercrombie | Jan. 10, 1939 |
| 2,610,820 | Markel | Sept. 16, 1952 |